May 16, 1933.  J. H. ROBERTS  1,909,012
FABRICATING MACHINE FOR LONG STOCK
Original Filed July 10, 1928  3 Sheets-Sheet 1
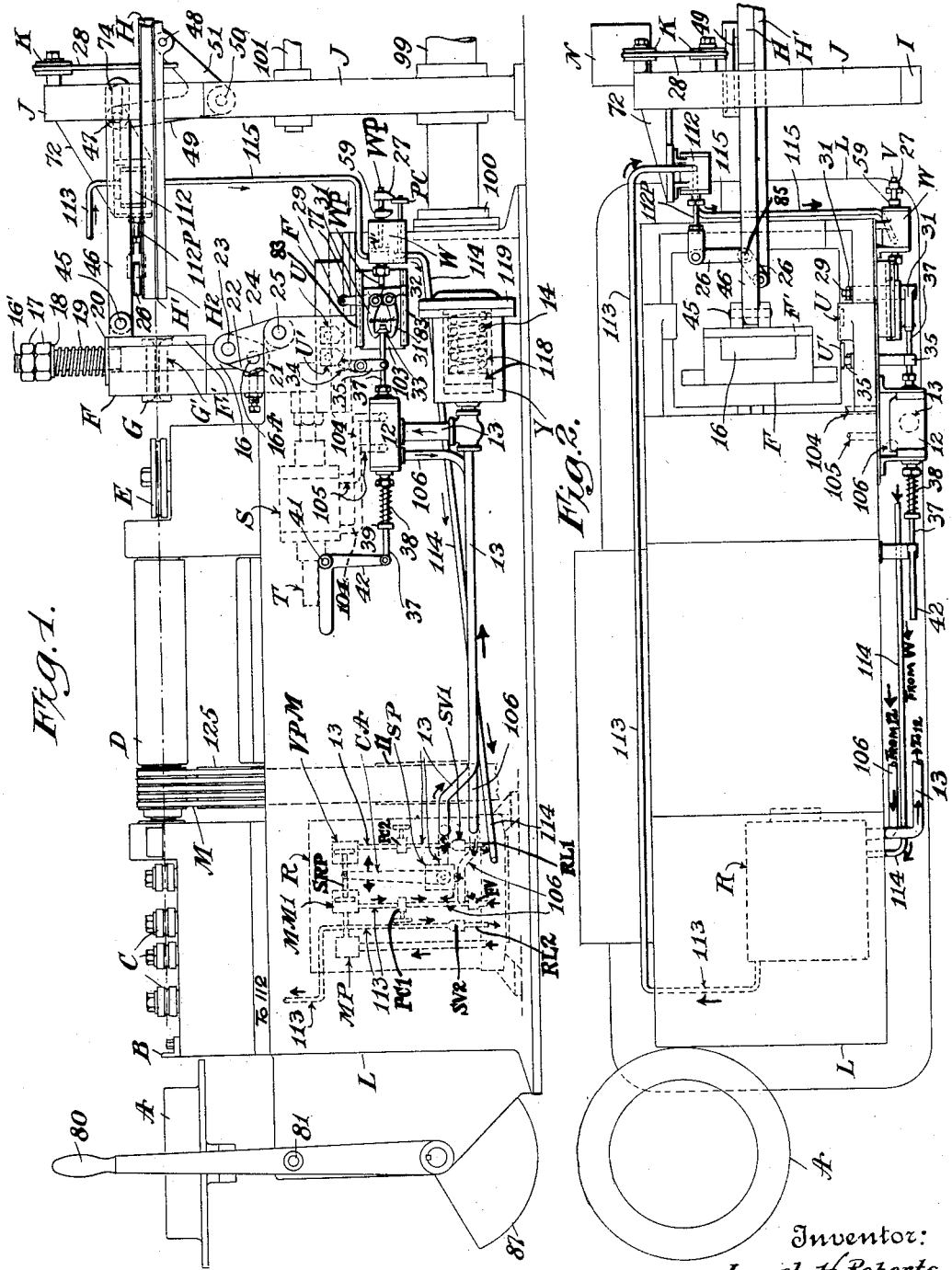
Inventor:
Joseph H. Roberts
By his Attorney
Philip Farnsworth

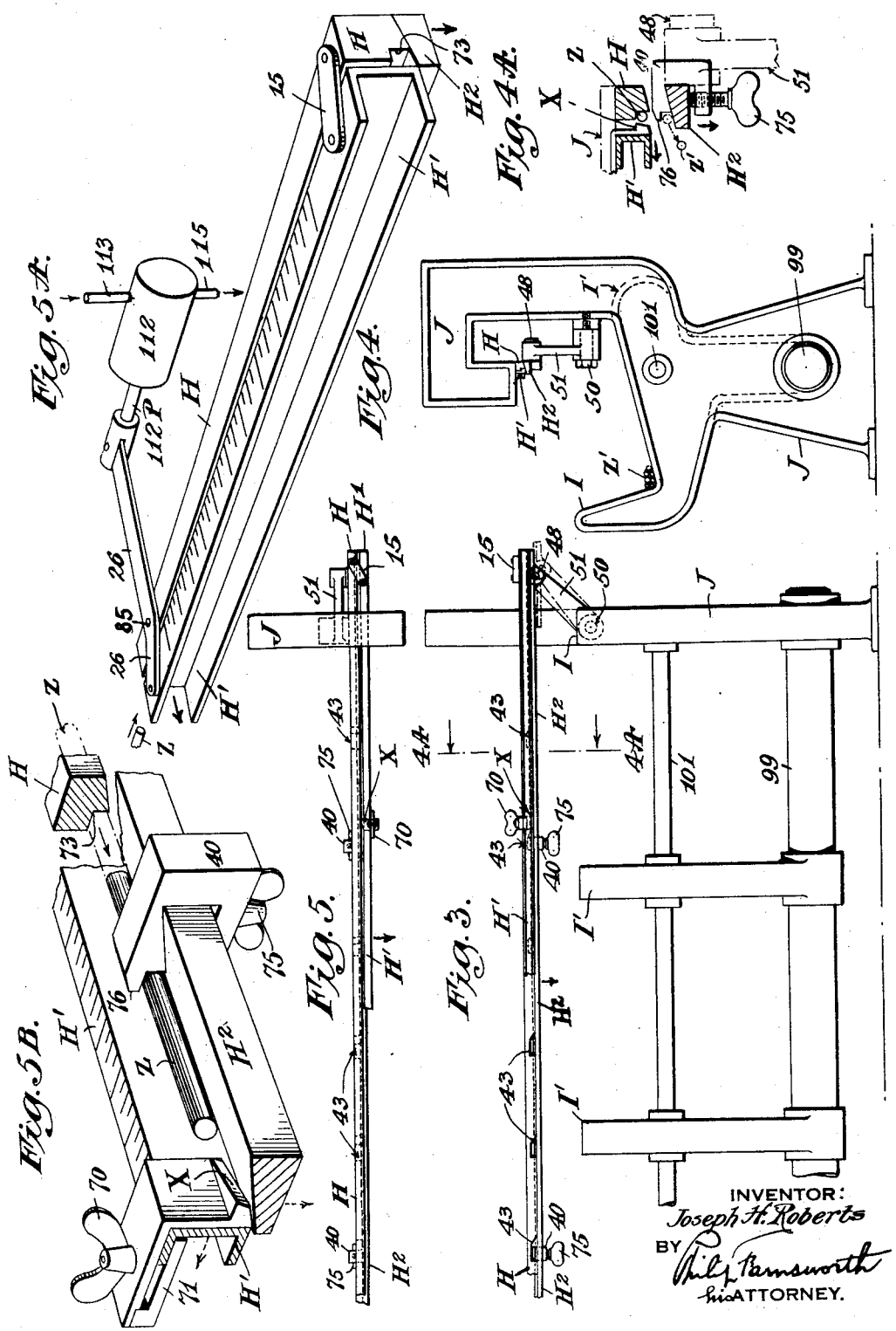

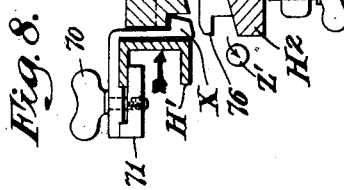
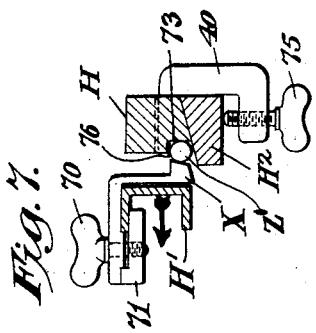
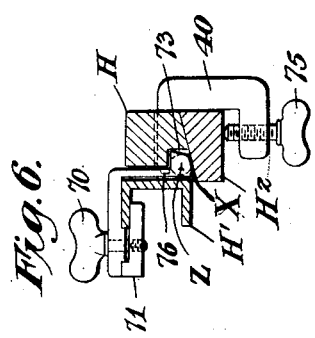
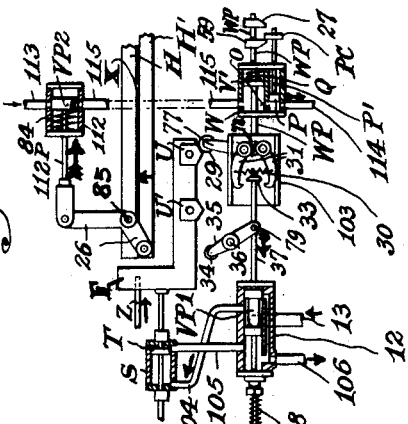
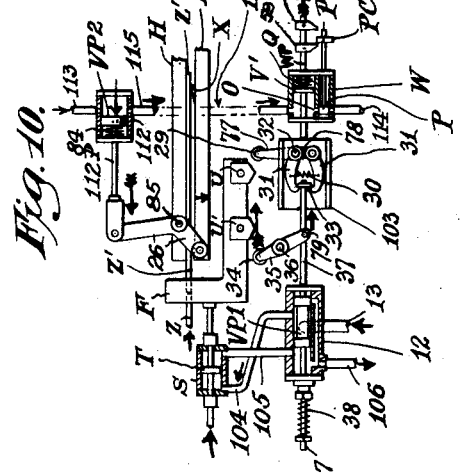
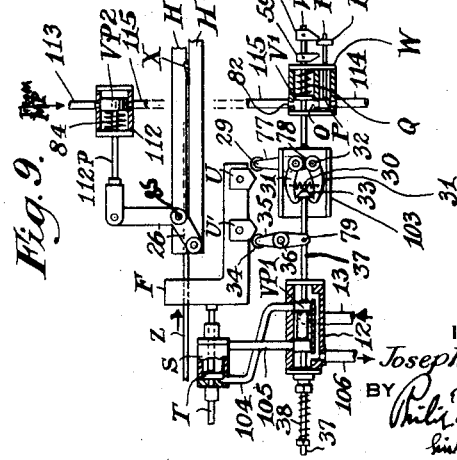

Patented May 16, 1933

1,909,012

UNITED STATES PATENT OFFICE

JOSEPH H. ROBERTS, OF WATERBURY, CONNECTICUT, ASSIGNOR TO F. B. SHUSTER CO., INC., OF NEW HAVEN, CONNECTICUT, A CORPORATION

FABRICATING MACHINE FOR LONG STOCK

Application filed July 10, 1928, Serial No. 291,651. Renewed February 21, 1931.

This application is a continuation in part of my application Serial No. 274,750, filed May 3, 1928.

This invention relates to machines of the type wherein long stock, such as wires, rods, or long, relatively narrow sheets, particularly of metal, as steel, is fed continuously to a fabricating mechanism which acts on uniformly spaced portions of the length of the stock, the fabricating mechanism being an intermittently reciprocating or "flying" element which during its fabricating operation moves in synchronism and parallelism with the long moving stock but over a distance which is very short relative to the space between the portions of the long moving stock on which it acts, i. e. relative to the distance traversed by the stock in the time interval between the successive fabricating operations of the fabricating mechanism; and the fabricating mechanism spends most of its time at rest during the intervals while the long stock is being fed thru the machine.

The invention relates more particularly to the combination of hydraulic apparatus with such types of machine for the purpose of effectuating hydraulic operation of the reciprocating fabricating mechanism.

One of the important objects of the invention hereof is a machine having a hydraulic system for the operation of the fabricating mechanism, which hydraulic system is provided with a control by way of the moving long stock itself instead of a control which, altho also acting in accord with the feeding movement of the stock, yet is not operated by the feeding movement of the stock itself.

The invention is embodied in the arrangements shown by way of example in the accompanying drawings which illustrate an embodiment of the invention in a straightening and shearing machine which in general is shown as resembling that of my said prior application, being particularly adapted to straighten and shear rods or wires manufactured in long lengths, into shorter lengths convenient for transport and use in the mechanical arts, the general principle of the invention being capable of embodiment also in machines for similar treatment of long steel strips.

Of the drawings,

Fig. 1 is a front elevation (as the operator faces the machine) in which the lighter lines in general show parts of the machine in which the invention is embodied; the heavier and dotted lines at left and right indicating the parts to which the present invention more particularly relates;

Fig. 2 is a top plan of Fig. 1 wherein the heavier lines at right show some of the parts particularly involved herein;

Fig. 3 is a front elevation of the right-hand portion of the machine continuing from the right of Figs. 1 and 2; Fig. 3 showing, below the receiving mechanism I, $I^1$ for the fabricated or cut stock and at the top the mechanism for discharging the relatively short cut lengths of stock into said receiving means, said discharging mechanism being involved with the hydraulic apparatus (to be described) and combined with the control of the latter as a special feature of the present invention;

Fig. 4 is an end elevation of Fig. 3 showing the receiving apparatus I, $I^1$ and the discharging mechanism H, etc., of Fig. 3 and the lengths $Z^1$ of cut stock after discharge into the receiving apparatus;

Fig. 4A is an enlarged section at 4A of Fig. 3 showing more clearly the stock-discharging mechanism H, etc., of Figs. 3 and 4 and illustrating the relations of the parts at the instant when a cut length $Z^1$ of the long stock is being discharged, i. e., just after the fabricating operation, the cut length being on its way to the receiving apparatus I, $I^1$ of Fig. 4;

Fig. 5 is a top plan view of Fig. 3 illustrating the right hand end portion of the long horizontal length of the discharging apparatus, corresponding with the length of the cut stock $Z^1$, and showing the target X which is adjustable along the horizontal length of said apparatus, said target being operated by the front end or van of the stock (being fed to the target X) to control the operation of the hydraulic apparatus which provides the power for the shearing or other fabricating operation on linearly spaced portions of the stock;

Figs. 5A and 5B are perspectives more clearly showing the construction and arrangement of target X and the principal parts of the stock-discharging apparatus or guides which co-operate with such target and with the length of stock to be cut off; Fig. 5B showing the stock Z being fed to target X.

Figs. 6–8 are sections (4A of Fig. 3) showing details of the structure of target X and its combination with the discharging mechanism or guides for the forward ends of the stock Z which are to be cut into shorter lengths $Z^1$; these three views also showing the different relations of the parts at three successive stages of operation, i. e. Fig. 6 showing their normal relations as just prior to the operation of target X by the van (right-hand end $Z^1$) of stock Z which see in this figure; Fig. 7 just after said target-operation and before the shearing operation on the stock; and Fig. 8 a little later after the shearing operation and just prior to the return of the fabricating mechanism F and the stock-discharging mechanism or guides $H^1$, $H^2$ to the normal condition thereof shown in Fig. 6;

Figs. 9–11 are diagrams showing the details of construction and operation of the hydraulic apparatus shown in Figs. 1 and 2 and operating the shearing mechanism under control of target X of Figs. 6–8; Fig. 9 showing the conditions corresponding with Fig. 6, Fig. 10 with Fig. 7, and Fig. 11 with Fig. 8.

The long stock to be operated on is supplied to the machine in the form of a coil which is placed on reel A at the left of Fig. 1, the rod or wire being fed from reel A rightwardly clear across Fig. 1 and toward the right of Figs. 3 and 5. The actual fabricating operations all are performed on the stock by the apparatus shown in Fig. 1. For example, the final fabricating operation in the present case is that effected by shearing dies or tools G, $G^1$ carried by horizontally reciprocable mechanism F. The hydraulic apparatus is shown in Figs. 1 and 2 as mounted below and to the left of reciprocable mechanism F. The discharging and controlling mechanism is shown as extending from the right of F in Figs. 1 and 2 and continuing to Fig. 3 and the right-hand portion thereof. Three principal parts of such discharging and controlling mechanism, H, $H^1$ and $H^2$ are shown in Fig. 1 as broken away at the right and in Fig. 3 as broken away at the left, indicating that the horizontal length of such mechanism is sufficient for the maximum fabricated sub-lengths $Z^1$, Figs. 4, 4A, and 8, of the long stock Z from reel A. Such relatively short fabricated or cut lengths $Z^1$ may be as long as 20 feet or more.

In accordance with some features of the present invention the hydraulic apparatus which operates F, G, $G^1$ of Figs. 1 and 3 is controlled by the operation of target X (Figs. 3, 5, and 5B), X being adjustably mounted at the desired horizontal portion of the stock discharging and controlling mechanism which extends from the right of shearing mechanism F (Figs. 1–2) to the right of Fig. 3, so that said target is operated by the front end or van of the continuously fed stock Z; the adjusted position of target X being such as to cause the production of sub-lengths of stock having the desired length, and all the sub-sections having the same length from a given adjustment. Target X is set to adjusted position by the operator of the machine in accordance with the lengths of stock desired to be cut in any given job from a coil of the unprocessed stock mounted on reel A of Fig. 1 or from a plurality of coils successively placed on reel A by the operator.

The fabricating operations other than those executed by the shearing mechanism F, G and $G^1$ of Fig. 1 preferably are executed by mechanical apparatus (located between reel A and F) other than the hydraulic apparatus herein provided particularly for F, G and $G^1$. In general the straightening and shearing means in Fig. 1, at left of F, when used, may be the same, for example, as in my said prior application for patent and as shown in Figs. 1–2 hereof. This machine comprises a main frame L, counter-balanced (87) reel A for the roll of stock to be fabricated; a guide B for the stock passing from the reel to the right; rolls C for feeding and straightening the stock; a rotary flier D (with internal dies staggered with respect to one another and thru which the wire or rod passes for further straightening the long stock Z); suitable feeding means E (for feeding by pulling the stock from flier D to the right); none of the above elements being operated by the hydraulic apparatus herein; and finally the reciprocable shearing or other fabricating mechanism F, G, $G^1$ operated by the hydraulic apparatus which in turn is shown as controlled by the van of the continuously fed stock which operates target X of Figs. 3, 5 and 5A.

The hydraulic (preferably oil) pumps, control motors, etc., are located in casing R, Fig. 2, with oil sump at bottom, and the contents of R may be as shown in Fig. 1 and described in detail hereinafter.

Altho only the shearing mechanism F, G, $G^1$ and its control are operated by the hydraulic apparatus, yet the power for the entire machine including that for operating the oil pumps in casing R, may consist of a main driver in the form of a constant speed electric motor (not shown) driving a belt M (Fig. 1) which drives a sheave 125 which operates rolls C, flier D and feed E; belt M also driving sheave 11 which operates the oil-pumps in casing R to furnish the oil-pressure to operate F, G and G¹.

Thus, in detail, the power for horizontally reciprocating F and vertically reciprocating shearing tool G¹ is derived from oil-pump (slave-pump) S P in casing R; the oil under highest pressure existing in pipe 13 from pump S P; and the oil under lower pressure (return directly to S P, not via the bottom sump) existing in pipe 106. Pump S P is termed the slave-pump because it provides the oil-pressure for doing the heavy work of horizontally reciprocating mechanism F which in turn causes vertical reciprocation of shearing die G¹, Fig. 1, F being supplied with oil pressure from this slave pump; and S P is termed the slave-pump also because the operation of the oil pressure from this pump is controlled by automatically-operating master-apparatus to be described (including control trip or target X) which determines the times of intermittent operation of F and G¹ by means of the oil-pressure furnished by S P.

The power for the master-apparatus which (initiated by trip X) controls the hydraulic operation of reciprocable elements or shearing tools G and G¹ is derived (in the example shown) from oil-pump (master-pump) M P in casing R; the oil under pressure (much lower than in master pipe 13) existing in supply pipe 113 from the pump, and the oil not under pressure returning via pipe 114 to the sump inside the bottom of casing R. Pump M P is termed the master-pump because it furnishes the oil-pressure by which the operations of F and tools G and G¹ are controlled by the initiation of target X by the van of the continuously fed stock Z.

The fabricating mechanism F, etc., Fig. 1, is slidably reciprocated horizontally on frame L, intermittently from normal position at left, to right, and then back to normal at left, such excursion occurring after time-intervals (which in the present machine need not be of uniform duration) which determine the distance between the portions of the stock on which acts the shearing die G¹ carried by F. The stock is fed by C and E (without intentional discontinuity or variation of speed) thru die G, (fixedly mounted in F), and die G¹ (vertically reciprocable in F); successive downward operations of die G¹ occur only after uniform lengths of stock have been fed rightward to target X; during most of the time the stock is being fed, mechanisms F, G and G¹ are at rest in a position at left of their excursions, Figs. 1 and 9; and each horizontal excursion of F (rightward and leftward) is very short in distance and time, (cf. Figs. 9, 10 and 11), occurring only after quite a number of feet of long stock Z have been fed to right thru dies G, G¹, from reel A, left in Fig. 1 to the right of Figs. 3 and 5.

F and G¹ are reciprocated (Fig. 1) by oil-motor (slave-motor) S fixedly mounted on frame L of the machine; motor S having piston T which is operated by oil under high pressure alternately in pipes 104, 105, in which the oil normally is static, i. e. while F is at rest at left of its excursions; said oil in 104 and 105 being put under high pressure (to move F horizontally in its two directions of motion) by being clutched to the high-pressure oil in supply pipe 13 from slave-pump S P, by means of slave-valve 12 also fixed to frame L of the machine (see also Figs. 9-11). Slave-valve 12 controls the leftward and rightward movements of piston T and of F and G¹ driven thereby respectively horizontally and vertically. Slave-valve 12 (during the time when F and T are in their normal positions of rest at the left during the feed of most of the stock) closes the high-pressure supply-pipe 13 so as normally to prevent the high oil-pressure in pipe 13 from acting on piston T of slave-motor S during the relatively long time while stock Z is being fed to X to determine the length to be cut by G¹; this normal position of slave-valve 12 being its neutral position.

The successive downward movements of die or other tool G¹ against stock Z occur (in the particular example shown) during the first half or less of the first or rightward movement of the intermittent excursion of F, (Fig. 1); such downward movement of G¹ being effected by the power of slave-motor S via the connections shown including carrier F and the linkages 22—25 between it and tool G¹, all as in my said prior application for patent.

The operation by shearing die G¹ downward on stock Z (or a similar operation of punching the stock with or without a perforation of it) is the peak of the fabricating load on slave-motor S; and to handle that peak an auxiliary pressure means or booster Y (mounted on machine frame L) preferably is used. Its piston 118 may be connected to high-pressure oil-supply line 13 as shown (Fig. 1); so that while F normally is at rest at left during the feeding of most of the length of stock Z, then the variable delivery slave-pump S P in casing R (operating automatically whenever there is work for it to do) may act to store oil under pressure in heavy spring 14 behind piston 118. Such energy stored by rightward movement of piston 118 by oil-pressure from S P then is available automatically via pipe 13 and slave-valve 12 (cooperatively with the continued operation of S P) whenever extra pressure is needed during the excursions of F and G¹, as when they are started from rest and reversed back to rest. The rightward movement of piston 118 may compress air if desired as when piston 118 and cylinder head 119 be made air-tight, in which case spring 14 may be dispensed with or retained as desired; and whether or not the oil-pressure from S P produces or assists in producing the pneumatic pressure the latter may be employed to boost the volume of oil under pressure from pump S P during the operations of F and G, all as described hereinafter.

The invention herein more particularly concerns (for example) the co-operation between master-pump M P in casing R and the stock-discharging and hydraulic-control apparatus including (Figs. 3-5) the movable stock-guides $H^1$ and $H^2$ and the movable target X. The shearing operation by hydraulically operated dies G and $G^1$ (Fig. 1) is effected substantially instantly after the movement of target X by the advancing stock (Figs. 5 and 5B), whereupon the cut stock $Z^1$ is dropped out of the apparatus of Fig. 5 (shown above in upper part of Fig. 3) as indicated in Fig. 4A, whence the relatively short cut length $Z^1$ falls into the receiving apparatus I, $I^1$ in the lower parts of Figs. 3 and 4.

The sidewise horizontal movement of target X by the van of the rightwardly fed stock moves guide $H^1$ (Figs. 1-2), bell-crank 26 and piston-rod 112 P to open master-valve 112 and permit access of low oil-pressure from master-pump M P (in casing R) thru supply-pipe 113 to master-motor W. The master-valve 112 is mounted on a bracket 72 carried by upright J (Fig. 1), said upright being the main left-hand support of the discharging, controlling and receiving apparatus of Figs. 3-5, the right-hand main support of said apparatus being a duplicate upright J shown at the right of Fig. 3.

Master-motor W is controlled by master-valve 112 and operates slave-valve 12 which controls slave-motor S which effects reciprocations of F and $G^1$. Motor W (Fig. 1), slave-valve 12, slave-motor S, and liquid-reservoir Y all are mounted on machine-frame L, as shown.

Master-valve 112 is opened by the van of stock Z fed continuously from reel A thru elements B–E inclusive and thru fixed die G and vertically movable die $G^1$ both carried by horizontally reciprocable mechanism F. The van of the stock before striking trip or target X (Fig. 9) but after passing thru said under die G and $G^1$, enters a horizontal tubular space formed between the three horizontal guides H, $H^1$ and $H^2$ (Fig. 6) thru which the stock passes to the right-hand portions of said guides which are shown in Fig. 3. There the stock-van strikes target X located (Fig. 9) in the position in which the operator has clamped it to guide $H^1$ at the desired location between the left and right ends of said guides. As shown in Figs. 5B et al. a portion of target X is wedge-shaped as it lies in the path of the advancing stock; and when the latter advancing thru the guides abuts against said wedge (Fig. 9), the latter and the guide $H^1$ which is horizontally movable, are swung away from fixed guide H and operates $H^1$ (Figs. 2 and 9) linkage 26 connected to the left-hand portion of guide $H^1$ (Fig. 2) and thereby opens master-valve 112 to the piston rod 112 P of which 26 is connected (Fig. 10, contrasted with Fig. 9), and causes operation of master-motor W to initiate by way of slave-motor S the horizontal excursion of F and G which involves the vertical excursion of shearing die $G^1$ carried by F.

Motor S is reversed automatically (by the apparatus shown in Figs. 9-11) at the end of its forward stroke at right, and thereupon S returns F, G and $G^1$ to their normal position of rest at the left (Figs. 1, 2 and 9). The length of horizontal stroke of F is only a few inches (as contrasted with the cut lengths $Z^1$ of stock which may be ten or twenty feet more or less)—just enough to allow time during the rightward stroke of F for the downward shearing stroke of die $G^1$ and the upward stroke of the latter to return it to its normal position out of line with the rightwardly moving stock (where it permits continuous stock-feed) before the reduction of the rate of the rightward movement of F and $G^1$ in the direction of stock-feed to a rate less than the rate of stock-feed. As soon as the rightward movement of F started by target X is stopped, F is moved back to left by leftward operation of slave-motor S (caused by operation of cam U carried by F, Fig. 11) dies G and $G^1$ and cams U, $U^1$ being carried by F with it in its leftward movement, and the stock Z continuing its rightward feeding movement by E thru die and under G and $G^1$ while they are moving leftward and the stock also continuing to be fed to right after F reaches its normal position of rest at the left where F remains until the new stock-van (of the last shearing-cut) engages target X.

Long horizontal guides H, $H^1$ and $H^2$ are arranged in line with and in advance of the stock being fed past dies G, $G^1$, and they support a length of the forward end of the stock thereafter said guides having a sufficient horizontal length to support the maximum desired length of cut stock while the same is being sheared in mechanism F at the left of the guides H, etc. When the advanced end of stock Z from reel A has been fed into the space between said guides to the extent of the length desired to be cut (according to the setting of target X on the calibrated scale on horizontally swinging guide $H^1$, Fig. 5A) then F, G and $G^1$ are reciprocated to effect the shearing operation (F horizontally and $G^1$ both horizontally with G and G¹ also vertically relative to F and G).

Figs. 5A and 5B show in perspective the construction and arrangement of the three guides H, H¹ and H². Fig. 5B shows the relations of these guides to target X. Figs. 6-8 show respectively:—(Fig. 6) the normal relation of the guides forming the horizontal tubular passage for the principal feeding of stock Z, i. e. while F and G¹ are at rest (Fig. 9); Fig. 7 shows the relations of the guides to one another during the initation of horizontal forward stroke of F rightward and just before the downward movement of die G¹ (Fig. 10) the van of the stock having pushed aside wedge X and guide H¹ to start F rightward; and Fig. 8 shows the relations of the guides to one another just after the downward movement of G¹ and before F and G are reversed to move leftward back to their normal positions of rest, the depressible guide H² having been forced down to permit the discharge by gravity of the cut sub-lengths Z¹.

Stock Z advances forwardly (Fig. 5B) along the top of depressible bottom guide H² and between top guides H and H¹; the stock advancing (Fig. 6) thru the recess 73 formed in fixed guide H.

The three guides H, H¹ and H² have their fore and aft ends supported on left and right uprights J, J in position so that the left end of recess 73 in fixed guide H is in horizontal line with the horizontal stock-passages in guides G, G¹ and so that the left ends of the guides are near the right of die G¹ (Fig. 1) in all horizontal positions of G¹; but during that part of the forward stroke of F when G¹ is moving downwardly and upwardly, recess 73 in fixed guide H is higher than the passage in die G¹ altho in line with vertically fixed die G.

Figs. 4 and 4A illustrate the locations of the fore and aft ends of the three horizontal guides H, H¹ and H², i. e., below the overhanging goose-neck tops of uprights J, J. These two uprights are braced by horizontal steel bars or tubes 99 and 101, (Fig. 3) which intermediate their ends and intermediate the uprights J, J carry the receiving frames I, (integral with J, Fig. 2) and I¹ located below the guides H, etc. in position to receive the sub-lengths Z¹ of stock which drop by gravity into said frames I, I¹ when such sub-lengths are released from the guides by a downward movement of bottom guide H² (Fig. 8) by devices 40 to be described.

Guide H (Figs. 4 and 4A) is fixedly secured at its fore and aft ends to the bottoms of the overhanging goose-neck tops of left and right uprights J, J. Horizontally swinging guide H¹ (Figs. 2 and 6) is supported by fixed guide H, being mounted on the latter at 85 (Figs. 2 and 9) to swing horizontally away therefrom (to left, Figs. 4 and 4A, i. e. toward the front of the machine, Fig. 2) via the short-link portion of bell-crank 26 at the left ends of the guides (Figs. 2 and 1); and via the link 15 at the right ends of the guides (Fig. 5). Thus guide H¹ can be swung horizontaly by the abutting of the van of the stock against target X and it is so swung from its position of Fig. 6 closely adjacent stationary guide H, (leftward Fig. 7) to a position more remote from H. (See also plan of H, H¹, Figs. 9-10; Fig. 9, like Fig. 6, showing H¹ before it is swung from H; and Fig. 10, like Fig. 7, showing H¹ after it has been swung from H). Thus the rear end of the cut stock is no longer kept by H¹ from leaving the guides, but is free so far as H¹ is concerned to drop down as soon as it is cut; and thereupon bottom-guide H² is depressed (Fig. 8) as die G' goes down so that cut length Z¹ is entirely free to drop down.

Target X is the means for said leftward swinging of guide H¹, and another object and result of such swinging is to open master-valve 112 via bell-crank 26 (Figs. 9-10) thereby controlling the hydraulic operation of F and G¹ in a manner to be described hereinafter in relation to Figs. 9-11. The van of stock Z passing forward to right (Fig. 9) between the three guides H, H¹ and H², strikes the wedge-shaped lower end of target X (Fig. 5B) and forces H¹ to swing bodily away from H via links 15 and 26 keeping H and H¹ parallel with one another and by means of bell-crank 26 operating the master-valve 112, Fig. 10.

Target X is clamped to swinging channel-shaped guide H¹ (Figs. 6 and 5B) at any desired point of the horizontal length of the latter (Figs. 3 and 5). The location of target X relative to the horizontal length of H¹ will determine the length of the sheared, advanced ends Z¹ of the stock; so that as long as target X is left fixed in a given position, shearing die G¹ will be forced down to shear successive portions of the stock after feed of equal relatively short lengths of long stock Z. This insures equal lengths of cut stock Z¹ not only when long stock Z is fed at a uniform rate but even in case there should be slippage in the feed by rolls C and E; because F and G¹ do not move from their normal positions of rest until the given definite desired length of stock has been fed far enough to reach target X, and because G¹ acts (via the hydraulic control and power connections) almost instantly after the actuation of the target or trip. Even if a measurable amount of stock be fed beyond the target after the actuation of the latter and before the shearing operation of die G¹ (during normal stock-feeding), and even if the stock-feed should vary just after the actuation of target X, the cut lengths will be of substantially uniform lengths owing to the quickness with which the hydraulic operations are effected upon movement of X and owing to the certainty (due to the hydraulic operation) that the time-interval between the lateral movement of X and the downward movement of $G^1$ will be equally minute for all successive shearing operations. In short, as a practical matter substantially no portion of stock will pass beyond target X after the latter has opened master-valve 112.

Target X is clamped by the operator to swinging guide $H^1$ before startitng a given job on a roll or a plurality of rolls of stock successively placed on reel A. But guide $H^1$ is calibrated permanently by the manufacturer of the machine during testing operations of the latter. The calibration (Fig. 5A) is in feet and inches (or metric measure) indicating the lengths $Z^1$ into which long stock Z will be cut if the target be clamped on $H^1$ in such horizontal location thereon that a portion of the target (as its forward or right end) shall lie adjacent the appropriate scale-marking. At the time of calibration, stock actually is fed and cut in the machine, while the target is clamped successively in various positions along the horizontal length of guide $H^1$; the length of the stock is measured which is cut at each different position of the target; and those measurements are marked on $H^1$ to constitute the scale (Fig. 5A); or one cut may be made and from that as a base line the other gradations can be laid off by standard scale.

Fig. 6 shows a construction for clamping the target X to horizontally-swinging guide $H^1$. This guide may be a duralumin channel as shown. Target X itself is shown as an L-shaped member having its lower end (Fig. 6) wedge-shaped. Also see Figs. 5B and 4A. In the use of the completed machine by the operator the target X is clamped on $H^1$ at the desired scale-marking by means of a clamping member 71 and a thumb-screw 70 so that X and 71 are clamped to the upper flange of swinging channel-guide $H^1$; the vertical portion of the target engaging the vertical bottom face of the channel, as shown.

As soon as the stock has been sheared (Fig. 10) by the downward movement of die $G^1$ (or otherwise cut off as by a circular saw) via linkage 24 (Fig. 1) actuated by the forward movement of F caused by slave-motor S started via target X, then bottom-guide $H^2$ also is depressed (Fig. 8) (synchronously with $G^1$ when the operation is one of shearing) and the cut length $Z^1$ thereby made free to drop from between the top guides H, $H^1$ and target X, so that it can roll off the inclined top of bottom-guide $H^2$ and fall into stock-receivers I, $I^1$, Fig. 4.

The power for depressing bottom-guide $H^2$ is furnished by the forward movement of F caused by slave-motor S, via the horizontal link 46, (Figs. 1–2) pivoted at 45 to F at right so that the downward movement of the stock-supporting and discharging guide $H^2$ shall occur while the rear of the stock on $H^2$ is being sheared between dies G, $G^1$. The forward right end of link 46 is pivoted at 47, Fig. 1, to bell-crank lever 49—51. The latter is pivoted at 50 to left-hand upright J (at right, Fig. 1, the right-hand upright J being in Fig. 3 at right). The other end of bell-crank 51 is pivoted at 48 to the guide $H^2$ which is to be depressed; i. e., to a left-hand portion of $H^2$, so that the bell-crank portion 51 supports the left guide $H^2$ on the left upright J; the right-hand horizontal portion of guide $H^2$ being movably supported on right-hand upright J (Fig. 3) by link 51 pivoted to $H^2$ at 48 and to J at 50. Thus the rightward movement of F which causes shearing of the stock by the downward movement of $G^1$ also positively depresses $H^2$ via clockwise movement of bell-crank 49—51 to discharge the cut length $Z^1$, Fig. 8.

Means preferably are provided also to ensure that each cut length $Z^1$ of the stock is forced down positively with bottom guide $H^2$ from the outer two guides for discharge thereafter by gravity, as follows Figs. 3–8. Several pull-down devices 40 (as three or more) are clamped by their screws 75 at distributed points along the horizontal length of bottom guide $H^2$ (Fig. 3), between target X and the left end of $H^2$ adjacent F (Fig. 1). Each device 40 is formed with a top hook 76 (Fig. 8) which extends normally (while bottom-guide is up, Figs. 6–7) over the path of stock Z so that the latter travels in the tubular enclosure (Fig. 6) formed by the bottoms of hooks 76, the top wall of recess 73 in H, the side of said recess 73, the inclined top of bottom-guide $H^2$ and a part of the side of swinging channel-guide $H^1$. In order to permit access of hooks 76 thru fixed top-guide H to positions above directly adjacent stock Z where the hooks 76 positively can engage the top of the cut stock when $H^2$ is depressed and thereby pull the stock down, there are formed notches 43 (Fig. 3) in said fixed guide H at about every twelve inches or so of its horizontal length so that the hooks 76 of devices 40 can extend freely thru said notches 43 and have access to the stock. Thus any desired number of pull-down devices 40 (maximum corresponding with the number of notches 43) may be clamped by the screws 75 engaging the bottom of bottom-guide $H^2$. Since devices 40 are clamped to bottom-guide $H^2$, the depression of the latter will cause hooks 76 positively to pull down the cut stock (Fig. 8) from between top-guide H and target X so that discharge of the cut lengths $Z^1$ is assured. Devices 40 of course are clamped to $H^2$ alone (Fig. 8) and not to the stock.

$H^2$ is not raised back toward H, $H^1$ by F which positively depressed H² via bell-crank 49, but by weight N, Fig. 2. In case some object (such as a short crop-end of stock Z) should enter and become lodged between H² and top-guides H, H¹ while H² is depressed, then H² can remain down (Fig. 8) until such obstruction is removed and then weight N automatically will raise H² to its normal position (Fig. 6) directly adjacent H, H¹ and beneath them. To permit this, (1) means are provided (Fig. 1) to prevent link 46 from raising H² and (2) means are provided to permit N to raise H². First, link 46 is slotted at 74 (Fig. 1) to receive above described pivot 47, so that F can carry link 46 leftward without causing anti-clockwise movement of bell-crank 49—51. Second, weight N is connected to lever 51 by cable or chain 28 running on sheaves K, K (Figs. 1 and 2) so that N will lift bottom-guide H² and move bell-crank 49—51 anti-clockwise when no foreign object above H² prevents and when link 46 is being moved leftward by corresponding movement of F; pivot 47 of the bell-crank being free to follow such leftward movement; and when bell-crank 49—51 thus has been swung anti-clockwise its pivot 47 will continue to lie in the left end of slot 74 in position (in the next excursion of F and 46) to be moved clockwise to the right; so that bottom-guide H² will be depressed as the stock is sheared by die G¹.

Horizontally-swinging top-guide H¹ is not swung back toward fixed guide H from its position of Fig. 7 to its normal position of Fig. 6 by any rigid connections such as those (including target X) which swung it away from H, out by spring 84 which has been compressed (Fig. 10) by the master-valve piston V P² in the leftward movement thereof caused by the actuation of target X by the van of the stock.

After discharge of cut stock Z¹, the bottom-guide H² with devices 40 is returned to the normal positions of Fig. 6 as above described, i. e. by the action of weight N (Fig. 2) permitted by the leftward movement of link 46 by F. H¹ has been swung back horizontally toward H just previous to the raising of H² (Fig. 8), together with target X, because as soon as cut-stock length Z¹ has gone down from between H and target X, compressed spring 84 thereby is free to close master-valve 112 (Figs. 10–11) which via rightward movement of 112 P by 84 also swings H¹ toward H. In Fig. 8, H² thereafter is about to be raised by weight N (Fig. 1) as soon as certain elements start to move leftward, i. e. slave-motor S, fabricating mechanism F and link 46, Fig. 1; so that bottom-guide H² will be in position to support the new advanced van of stock Z then being fed thru F via G and G¹.

While guides H¹ and H² have been operating as above and as shown in Figs. 6–8, the hydraulic operations have been proceeding correspondingly as shown progressively in Figs. 9–11.

Master-valve 112 illustrates the fact of joint control of the hydraulic operation of F and G¹ by (1) the power of the moving stock fed thru F via G and G¹ by feeding means C and E and (2) the low-pressure oil supplied to the valve 112 via pipe 113 from master-pump M P in casing R, Fig. 1.

In Figs. 9 and 6 all the parts shown are in their normal states of rest save that stock Z is being fed rightward continuously thru F and into the horizontal guides H, etc., moving therein toward target X clamped to H¹. Master-valve 112 is closed, as normally, disconnecting supply pipe 113 of low-pressure oil from the static oil in pipe 115 normally open to piston V¹ of normally idle master-motor W. Said piston V¹ is stationary but in readiness (open at 82 to 115) to be moved to right to pull piston V P¹ of slave-valve 12 to right from its neutral position shown and cause initiation of rightward movement of the short excursion of piston T of slave-motor S, and of F driven thereby; and cams U and U¹ are mounted on F (Fig. 1) to move rightward therewith.

In Fig. 10 the van Z¹ of the stock has passed to the right of target X, having first moved the latter to open the master-valve 112 (to clutch the static oil in pipe 115 to the low-pressure oil in supply pipe 113) via bell-crank 26; the stock consequently is being sheared (by the operations of the dies in F driven by slave-motor S as indicated at the left in Fig. 10), and during the instant of depression (Fig. 8) of bottom-guide H² and pull-down devices 40, the right-hand cut length Z¹, (Fig. 10) having been forced by G¹ down below the work-line or line of stock-feed and below a horizontal passage through die G, has been pushed horizontally beyond target X by the vertically fixed die G just prior to being dropped as in Fig. 8. The shearing operation by the dies in F (Fig. 1) has occurred in Fig. 10 at about the first quarter of the rightward stroke of F driven by slave-motor S, and S and F continue to move rightward after the shearing of the cut length Z¹ including the depression of bottom-guide H². Fig. 10 shows that the low oil-pressure in the formerly (and normally) static oil in pipe 115 (such pressure having been caused by the opening of master-valve 112) has operated the master-motor W by moving its piston V¹ rightward (compressing coil spring Q) and thereby has caused the rightward opening movement of slave-valve 12 which has moved F rightward. This was done via tongs 31 pulling bolt or rod 37 and piston V P¹ of slave-valve 12 rightward and moving the latter from its normal neutral position of Fig. 9 to its position shown in Fig. 10 in which position the high-pressure oil in supply-pipe 13 from slave-motor S P in casing R (Fig. 1) is clutched to the static oil standing ready in pipe 104 leading to the left of piston T of slave-motor S to start the excursion of F which in Fig. 10 already has resulted in shearing the stock in the extremely brief time during which the stock-van has struck target X, operated it and passed slightly beyond it to the distance shown in Fig. 10. During this brief interval of time also slave-piston T and carrier F and its dies have been continuing to move rightward to give time after shearing for the vertically movable die ($G^1$ Fig. 1) to be moved up to put its horizontal passage in line with that in the fixed die G and with stock Z (by linkage 24, etc. Fig. 1) before the cessation of rightward movement of die $G^1$ can block the stock advancing from reel A.

During the above rightward movements of the parts in Fig. 10 which include F, cams U, $U^1$ and the parts below them, the spring 38 on bolt 37 has been further compressed than in Fig. 9; also spring 84 in master-valve 112 has been compressed and likewise spring Q in master motor W.

In Fig. 11 the piston $V^1$ of master-motor W has moved further rightward near the end of its stroke (cf. Fig. 10) carrying stop 59 (fixed to stem W P) against collar P C to move relief-valve P to right to open the relief-passage O to oil-return pipe 114; so that upon the closing of master-valve 112 said piston $V^1$ will not be prevented by the oil in motor W from leftward return by spring Q. Master-valve 112 is closed (Fig. 11) by expansion of its compressed spring 84 as soon as horizontal swinging guide $H^1$ (by the discharge of cut length $Z^1$) has ceased to be kept by $Z^1$ in its position relatively remote from fixed guide H (Fig. 10), said guide $H^1$ being swung back to its normal position (Figs. 11 and 6) by the closing (by spring 84) of master-valve 112 via piston V $P^2$. This closing of master-valve 112 is effected at the instant following the discharge of $Z^1$ from between target X and guide H (Figs. 7-8) and just before the end of the forward or rightward strokes of fabricating mechanism F and its motor-piston T. While the initiation of such rightward stroke of F and T is caused by target X, their reversal and leftward stroke back to normal position of rest at left (Fig. 9) is caused by the operation of the mechanism of Fig. 11 about to be described. But first, the result of said operation is as follows.

The leftward return of F and piston T back to their normal position of rest is effected by the reversal of slave-valve 12 i. e., by the movement of its piston V $P^1$ from the extreme right-hand position of Figs. 10 and 11 leftward beyond the neutral position of Fig. 9 to an extreme position at the left (not shown) inside the valve so as to close pipe 104 from high-pressure oil pipe 13 and to open pipe 105 to 13, so that the high oil-pressure from slave-pump S P in casing R (Fig. 1) is supplied to the right-hand side of piston T of slave-motor S. This reversal of slave-valve 12 is effected by the mechanism as shown in Fig. 11 as follows. The rightward movement of F in Figs. 10 and 11 has carried cams U, $U^1$ (mounted on and carried by F) rightward from their normal position of Fig. 9. In Fig. 11 the rightward movement of cam U has opened tongs 31 (at an instant when F is reaching the end of its rightward stroke) thereby releasing latch 33 (and thereby disconnecting bolt 37 from slide 103 and piston $V^1$) and permitting compressed spring 38 to snap or shoot bolt 37 leftward (indpendently of piston $V^1$) and effect the reversal of slave-valve 12 and consequently of slave-motor S and fabricating mechanism F; that is, valve-piston V $P^1$ of slave-valve 12 is shot abruptly from its forward or right-hand position of Fig. 10, leftward past its neutral position of Fig. 9 to an extreme leftward position (not shown) effecting reversal of slave-motor S. (Thus spring 38 assumes its normal less-compressed condition, not shown.) To open tongs 31 and permit this expanding action of spring 38, cam U, moving to right and striking roller 29, has swung clockwise the lever 77 pivoted at 32 to the slide 103 (to which upper tong 31 also is pivoted; slide 103 being movable in ways 83, Fig. 1) so that the two tongs (having intermeshing gear teeth 78) are pulled apart at their left hooked ends away from latch 33 fixed to horizontal reciprocating bolt 37. This frees bolt 37 so as to permit spring 38 to snap it to left. As the result of these operations, piston T of slave-motor S, and F, driven by piston T are reversed and started toward their normal positions at the left in Figs. 9 and 1. Also the opening of the tongs puts under tension their spring 30.

The above disconnection of bolt 37 from slide 103, rod W P and piston $V^1$ of master-valve W, permits the quick reversal of piston V $P^1$ of slave-valve 12 independently of the operation of piston $V^1$ of master-motor W by its compressed spring Q. But as soon as bolt 37 thus has been released to cause slave-motor S to start to move F and cam U leftward, the expanded tong-spring 30 closes tongs 31, carrying lever 77 to its normal vertical or "twelve o'clock" position of Figs. 9-10; and slide 103 is free (from 37 and U) so as to be slidable leftward on its ways 83 (Fig. 1) by compressed spring Q of master-motor W; this leftward movement of slide 103 being slower however, than the leftward shooting of 37 and piston V $P^1$ of slave-valve 12 because the expansion of spring Q is opposed somewhat by the oil at left of $V^1$.

V¹ (Fig. 11) on its leftward movement back to its normal position of Fig. 9 displaces or replaces part of that oil and said oil flows thru O until stop 27 engages collar P C (Figs. 11 and 9) and causes piston P to close O to leave a column of oil static in pipe 115 between P and V P² leaving V¹ open to 115, all in readiness for the next action of target X in opening master-valve 112 and connecting supply pipe 113 to master-motor W.

Meanwhile T and F have reached the end of their leftward stroke and piston V P¹ of slave-valve 12 is moved rightward to its normal neutral position of Fig. 9 (stopping S and F) from its extreme left position (not shown) where it has been admitting oil pressure from 13 to 105 to move T and F leftward. This neutralizing of slave-valve 12 and consequent stopping of the excursion of F and T are accomplished by a rightward movement of bolt 37 as follows. The above leftward shooting of bolt 37 by spring 38 has swung bell-crank 35 (pivoted at 36 to machine frame L Fig. 1) from its "eleven o'clock" position of Fig. 11 to a "one o'clock" position (not shown) in which position it is in readiness (while at rest) to be struck by left-hand cam U¹ in the final leftward movement of the latter by leftward movement of F, in order to move slave-valve 12 to neutral and shut off the slave-motor S completely. Bolt 37 and bell-crank 35 are at rest with the latter in its said "one o'clock" position during the leftward or final movement of T and F. But as T and F are about to reach their leftward positions of rest, cam U¹ carried leftward by F strikes roller 34 of link 35 (the latter being in the above "one o'clock" position) and cam U¹ swings 35 anti-clockwise back into its vertical or "twelve o'clock" position of Fig. 9 causing its lower end (pivoted at 79 to bolt 37) to move 37 rightward (partially on the way to its extreme rightward position of Fig. 11) far enough to move piston V P¹ of slave-valve 12 rightwardly to neutral position closing off the lower ends of both pipes 105 and 104, leaving columns of oil (1) in pipe 13 under pressure between Y and V P¹ and (2) static in 104 and 105. This partial rightward movement of bolt 37 increases loading compression of spring 38 (Fig. 9) which compression is completed later after the next operation of target X by the first above described further rightward movement of bolt 37 caused by rightward movement of piston V¹ of master-motor W (Figs. 10–11). This present partial rightward movement of bolt 37 (Fig. 9) is limited by the end of the leftward movement of cam U¹ by the leftward completion of the excursion of F.

Just before the above partial rightward movement of 37 and latch 33, the slide 103 has been moved leftward by spring Q (from positions of Fig. 11) at a rate slower than the leftward movement of shot bolt 37 (owing to the oil at left of piston V¹) and tongs 31 have been closed by their spring 30, while latch 33 yet remains at left where it was shot with bolt 37 from between the open tongs. These movements, i. e., leftward bodily movement of closed tongs 31 pivoted in slide 103, and rightward movements of bolt 37 and latch 33, cause tongs 31 and latch 33 to meet and forcibly engage one another, the wedge-shape latch 33 opening out the hooked ends of the closed tongs against their spring 30, and said latch passing between the thus opened tongs and engaging behind their hooks in the normal position shown in Fig. 9 in readiness for the next operation of master-valve 112 by target X, when piston V¹ of master-motor W, moving rightwardly (Fig. 10), also completes the above commenced rightward movement of bolt 37 clutched to W P via 31 and 33, thereby compressing or loading spring 38 (Fig. 11) at the time slave-valve 12 is moved rightward to initiate the cycle of F. This completes the cycle of all the apparatus shown in Figs. 6–11.

The operator in setting target X to the desired length-indications on the scale marked on horizontally swinging guide H¹ (Fig. 5A), according to the length of stock Z¹ to be cut, clamps target X in place (Fig. 6) and then starts an unprocessed length of stock Z through the machine from its coil on reel A, Fig. 1. But as the original van end of each coil of stock Z passes thru and beyond dies G and G¹ carried by F, the operator by the use of manually-operated bell-crank 42 (Figs. 1 and 2) institutes a preliminary cut-off cycle, for the purpose of shearing off the first few inches or the "crop end" of stock Z. This insures that the first subsequent automatically-cut length of stock Z¹ shall have a clean-cut forward end. Thereafter the stock Z is uninterruptedly fed forward by and thru B, C, D, E and F of the machine until the stock-van strikes target X and automatically institutes the subsequent operations above described, including shearing by G, G¹ into predetermined sub-lengths Z¹ as shown for example, until the unprocessed stock Z of the coil thereof on reel A has passed through the machine. The total length of stock in a roll on reel A is unlikely ever to be an exact multiple of the relatively short lengths Z¹ into which it is sheared; and therefore the tail of the roll will be more or less shorter than the desired fabricated lengths Z¹, i. e., too short for its van to contact with the target trip X before its rear end has passed out of the forward feeding mechanism E. Hence this tail will lie inert in the machine and must be manually removed by the operator before operation is started or another roll of stock is placed in reel A.

The invention is not limited to any particular type of hydraulic apparatus nor any particular arrangement of such apparatus, nor any particular means of controlling hydraulic apparatus by the stock-van to operate the mechanism which fabricates the long stock at linearly spaced portions; nor is the invention limited to means which effects a fabricating operation of shearing as by dies G, G¹, for the operation may be one of punching or cutting by a circular saw, etc., etc.; and a plurality of different fabricating operations may be executed on successive portions of the same long stock by a plurality of horizontally reciprocating elements each operated and controlled substantially similarly to the present disclosure, as for example, a punching operation and a shearing operation can be executed substantially simultaneously by successively located mechanisms. But the invention at present is considered to be most useful wherein as shown the reciprocating, hydraulically-operated and stock-movement-controlled element such as F is adapted to shear the longer stock into shorter lengths after preliminary straightening or by C and D. While the control of the hydraulic apparatus by the feeding movement of the stock is believed at present to be most useful in the form where the control is effected by the van of the stock and in connection with the cut-length stock-discharging apparatus, yet it is within the principle of the invention to control the hydraulic operations by means of the feeding movement of the stock from any or all portions of the linear length of the stock as for example by way of a member which is moved continuously and progressively by the feeding movement of the stock. And various features of the invention hereof may be employed in connection with a master control not operated by the movement of the stock altho in accord therewith as in my said prior application for patent.

While preferably the hydraulic apparatus is as disclosed and both the master-apparatus and the slave-apparatus are hydraulically driven, yet the master-apparatus hydraulically operated and controlled by a stock-target trip, may be employed to control the operation of a slave-apparatus mechanically driven by any suitable mechanism such as the well-known "one-revolution" roll-locking positively acting clutch, and in any case the hydraulic master-apparatus may be supplied with pressure by any suitable type of hydraulic (as oil) pump. For example the master-pump M P may be a "Model C" or "Model M" pump as made by Tuthill Pump Company of Chicago and adapted to deliver oil pressure of about one hundred pounds per square inch to master-motor W. And with any such hydraulic master mechanism controlled by feeding movement of the stock Z, the fabricating mechanism F or its equivalent herein, operated by any suitable mechanical slave apparatus such as the above revolution clutch, may be controlled by the hydraulic master in substantially the manner hereinbefore described. For example, the general construction and operation including target X being generally the same, the movement of bolt 37 by master-motor W may cause removal of a stop which normally holds stationary the one-revolution clutch as a slave-clutch herein, the stop being removed from under the basket nose of the slave clutch "roll" basket, and the freeing of the roll basket causing the coiled torson spring of the latter to actuate the "basketed" locking rolls into engagement during one revolution of the slave clutch member. After the fabricating operation by F, (and before completion of the rotative cycle of the roll clutch) any suitable means (as the equivalent of the cams U or U¹ carried by F and moved with it by the drive) can be employed for the purpose of positively placing the stop of the one-revolution slave clutch back to normal position of rest such as to allow the subsequent reverse movement of bolt 37 (above described) by means of spring 38 previously compressed by the above action of master-motor W. Such reverse movement of bolt 37 will lock the stop of the slave-clutch positively in a cocked position in readiness to be fired indirectly by the van of the stock acting on target X. Meanwhile the basket nose of the one-revolution slave clutch has been revolving clockwise with the other member of the slave-clutch; and near the end of such revolution it impinges against the stop and brings the clutch to a stop (aided by any well-known braking means) at the end of each rotation cycle.

The Model M pump above referred to possesses the advantages of being a positive-displacement high speed direct-connected pump having balanced lands which (in Model M) act as self-contained relief valve, such lands automatically compensating for wear, and no separate relief valve being needed nor any foot-valves or check-valves.

In any case the hydraulic operation of the master motor V¹ may be by way of power supplied entirely by the movement of the fabricating mechanism, that is, without an oil-pump supplying pressure to the master-motor. For example, (without any oil-supply 113) a column of oil may fill a closed system comprising pipe 115 and the entire space between pistons V P² and V¹, so that when the stock operates H¹, 26 and V P² then the latter can be moved by 26 so as to put under pressure the oil in pipe 115 and move piston V¹ to right as in Figs. 10–11.

Preferably the auxiliary pressure apparatus Y, 118 of Fig. 1 is used to add to the oil-volume from pump S P for action on piston T of motor S; and when, as above, the rightward movement of piston 118 of volume-accumulator or booster Y causes compression of air instead of or in addition to compression of heavy spring 114, then the casing or cylinder Y (having its head 119 secured to it in an air-tight manner by suitable cap-screws and with piston 118 packed air-tight) may be arranged preferably vertically instead of horizontally as shown; the pneumatic pressure then existing in the chamber comprised by the portion of Y between cylinder head 119 and piston 118. Thus the volume-delivery from S P is added to, (for the purpose of operating T, F and G¹) by the oil-discharge from Y to 13 caused by the pneumatic pressure behind piston 118. The pneumatic cylinder Y may be connected with an auxiliary compressed-air system having in its line a compressed air storage tank (to replace any leakage) between the auxiliary air-compressor of the compressed air system and the operating piston 118 of cylinder Y; so that any desired amount of pneumatic pressure can be put behind the oil in Y. Also an ordinary air check-valve is inserted in the compressed air line between such storage tank and the auxiliary air-compressor, so that the latter automatically will maintain substantially the desired pressure in the storage tank. Such storage tank also has various other advantages including the following:—it provides sufficient capacity for compressed air so as to maintain the desired pressure on 118 during the whole stroke of the latter caused by the air; it provides sufficient space to take care of the air-displacement caused by operation of 118 by the oil from pump S P; and it thereby permits ample space in Y for the reception of as much volume of oil as may be desired without unduly increasing the capacity of Y itself.

Whether or not there be used an air compressor auxiliary or additional to Y—118, the operation will be that when pipe 13 is connected to pipe 104, the pneumatic pressure behind piston 118 will be intensified and transmitted via the oil under hydraulic pressure in Y, 13 and 104, to move T and F rightwardly and G¹ downwardly for the shearing operation. Thus the pneumatic pressure is auxiliary to the oil volume delivery from pump S P and does not act directly on piston T, of slave-motor S; pump S P (as any suitable type of variable delivery oil-pump), accelerating automatically upon the coming on of the load comprised by the operation of F, and said pump S P maintaining an hydraulic pressure on piston T of motor S which pressure may dominate the fabricating operation and insures the positive and uniform action characteristic of hydraulic pressure as distinguished from pneumatic pressure; and the pneumatic pressure behind piston 118 serves only but usefully as an auxiliary to said oil-volume from S P to add thereto during the time when pump S P is operating to maintain the desirable hydraulic head by restoring the oil-flow energy utilized in operating F and G¹. The above automatic action of pump S P may be effected by a control of it by movement of piston 118, so that S P is accelerated by the movement of 118 caused by the pneumatic-pressure in Y.

The general advantage of employing a pneumatic system auxiliary to Y and to a slave-pump S P for intermittent drive of T and F (after relatively long pauses of T and F at rest) is that thereby the cost of the hydraulic apparatus can be decreased substantially.

When there is hydraulic pressure on one side of piston 118 and pneumatic pressure on the other side, as above, and when as here the hydraulic pressure is preferably from four hundred or less to three thousand pounds per square inch or more; and when the pneumatic pressure is less than such minimum hydraulic pressure (i. e., a pressure usual in pneumatic systems), then the area of piston 118 exposed to the pneumatic pressure should be greater than its area exposed to the hydraulic pressure, but not too much greater. Thus, the action of booster Y with its pneumatic pressure is relied on substantially exclusively to give the initial shove to T and F and to provide the power for the fabricating operation, because hydraulic motor S P when of the variable delivery type does not accelerate until after T and F commence to move, and said pump does not contribute very largely to the hydraulic operation of T and F until after their fabricating operations, it being largely the function of the pneumatic pressure to provide the hydraulic pressure for such fabricating operation. But by the time that T and F have reached their positions of rest at the left, pump S P has accelerated fully in readiness to reverse piston 118 and return it to its normal position of rest; and the area of 118 of Y next the air should not be so large as to prevent the oil from S P from so returning the piston; altho such area of 118 next to the air should be enough larger than its area on the oil side so that the air can operate 118 to effectuate the fabricating movements of T, F and G¹ during the time while S P is accelerating altho not yet fully accelerated.

Just as the pneumatic pressure may be employed in lieu of the compression of spring 114 (particularly for high power machines as for shearing thick rods or wide metal sheets) so for machines of any power, other sources of energy may be used in lieu of the pneumatic pressure. For example there may be used the energy stored in a heavy weight lifted by the hydraulic pressure from pump S P; or steam may be used in lieu of compressed air, as in the manner of operating a steam hammer. When a weight is employed, however, an hydraulic shock absorber of any standard design is installed in the hydraulic system to take care of the shock or water-hammer action of the descending weight; that is, such absorber is installed in series with the pipe-line 13 at any part thereof; and such hydraulic shock absorber consists of a plunger working in an hydraulic cylinder and loaded by a nest of helical compression springs.

In the above case of an air-compressor, a storage tank supplied thereby, and the latter connected to piston 118 in cylinder Y, the equipment may include the usual automatic means, including the check-valve between compressor and storage tank, for maintaining the desired pressure in the storage tank and preventing back-pressure on the compressor pump. Thus, with an electric motor driving the compressor, such motor is started and stopped in accord with the effect of fluctuations of pressure on an air-gage located between the compressor and the check-valve, i. e., the variations of air pressure at the gage (as between low of 125 and high of 140 pounds) operate an electric switch controlling the motor.

If there be used the above air-compressor (auxiliary to 118) supplying compressed air to piston 118 then an oil-throttle valve advantageously may be placed between Y in the cylinder Y and slave-valve 12 in the oil-line 13 for the purpose of adjusting the rate of movement of T, F and $G^1$ during the fabricating operation.

In accordance with the present invention the target X or an equivalent and suitable mechanism operated thereby may be connected to operate the valve 12 in a case where oil exists under pneumatic pressure in pipe 13 (between valve 12 and piston 118) as well as in pipes 104—105 (statically until valve 12 is operated); the oil in 13 being put under fabricating pressure exclusively by the pneumatic pressure from such auxiliary air-compressor, and valve 12 being operated via target X at times insuring uniformity of cut lengths $Z^1$, of the stock actuating target X; it being understood that the proportions in such an organization shall be such as to secure the positive and uniform operation of an hydraulic fluid on the fabricating mechanism as distinguished from the unreliable action of pneumatic pressure directly on the mechanism without the interposition of an hydraulic column. In such case the cost of the hydraulic pumping apparatus in casing R is eliminated completely altho there are retained the oil-valve 12 and the oil-motor S. The pneumatic pressure from the air-compressor usefully may be employed in such case to restore piston 118 to its normal position in readiness for the next pneumatic operation; and such employment may be by any suitable arrangement such as two pistons 118 in parallel to one another with appropriate automatic controls, the area of the second piston next the pneumatic pressure being greater than the area of the first piston next the pneumatic pressure; or such as a single piston 118 provided with any suitable automatic valves which supply the pneumatic pressure alternately to opposite sides of the piston. Furthermore, in any case of the use of an air compressor (with or without the use of an hydraulic pump such as S P acting on the oil between 12 and 118 to co-operate with such air compressor in compressing the air behind 118) the above arrangement of oil-throttle control between 118 and 12 possesses the advantage of permitting a wide range of speeds for F, as desired for different conditions of working, say, from eighty feet of feed of stock per minute to three hundred or more feet per minute.

If desired, slave-valve 12 may be of a design using the principle of the well-known poppet type widely used in automotive service; this being especially advantageous in connection with the master-control by target X in that the poppet type of valve can be opened wide by minimum movement, thereby insuring full speed ahead of T and F in a minimum time after operation of target X and with minimum movement of guide $H^1$ and the piston of master-motor W. In fact, if desired, and especially with a quick-acting valve 12, the movement of target X via some such translating device as guide $H^1$ may act directly on slide 103 or the like thereby dispensing with hydraulic control by master-motor W and thereby yet further reducing the cost of the hydraulic portion of the entire apparatus.

When master-pump M P of Fig. 1 is omitted in any modification of the invention, (whether or not hydraulic master-motor W be retained) it is permissible yet to retain the particular automatically variable type of slave-pump S P (Fig. 1) described in my said prior application for patent; and in such case the function of master-pump M P (Fig. 1) via oil-motor M M 1 in tending to force control-arm C A clockwise to right for full stroke operation of S P may be executed by a coil spring substituted for oil motor M M 1 so that such spring compressed by high oil-pressure in 13 by action to left of motor V P M can act subsequently by means of the energy so stored in such spring for the purpose of keeping control-arm C A over clockwise to the right for full-stroke operation of slave-pump S P.

While the machine here disclosed by way of a sample embodiment of the invention includes mechanism particularly adapted to the handling of rods or wires yet such mechanism can be replaced by mechanism suitable for handling sheets as of steel or other material; and in general, the invention hereof can be embodied in a wide variety of machines.

In the claims the expressions hydraulic pump and hydraulic slave-pump are to be understood as defining any means for putting a liquid under pressure inclusive of the above air-compressor 118 in Y whereby the pneumatic pressure to the right of 118 acts to put pressure on the oil in 13; and similarly, an air-compressor auxiliary to piston 118 and used to supply pneumatic pressure to the right of 118, is an hydraulic pump in the same sense as slave-pump S P in that it puts the oil in 13 under pressure (by some such pressure-converting means as piston 118) thereby providing hydraulic pressure to operate slave-motor S; so that it is possible not only to retain slave-pump S P with the use of 118 or with an air-compressor auxiliary to 118 but also to provide with 118 an air-compressor supplying pneumatic pressure to 118 without the use of any regular hydraulic pump S P at all; so that such air-compressor together with 118 constitutes the hydraulic slave-pump for hydraulic slave-motor S which drives F and $G^1$.

The hydraulic apparatus inside casing R includes (Fig. 1) the slave pump SP, the master pump MP, and other mechanism to be described and involving cooperation between said two pumps whereby together they constitute an unitary variable-pressure pumping system for operating intermittently acting fabricating mechanism F; both the slave and master pumps being useful together for the operation of F by SP; and master pump MP having an additional function in operating master cam X.

Master pump MP is a small low pressure gear pump of standard type, delivering about 100 lbs. oil pressure per square inch.

Slave pump SP itself is a high pressure variable delivery pump of standard type, delivering oil pressure according to different adjustments as desired from 300 lbs. to 1,000 lbs., which is why it is called a variable delivery pump. The details of this pump SP are not necessary to be described, for the preferred pump described generally is of standard type and it may be for example, the type WE high pressure variable delivery pump as made by The Oilgear Company of Milwaukee, save that here this pump delivers the pressure always in one direction, (due to the character of the control mechanism to be described), i. e., from high pressure pipe 13 to lower pressure or return pipe 106; hence valve 12 is used here to permit reversal of slave motor S here shown as a reciprocating motor. There always is pressure in return 106, i. e., of about 30 lbs., and altho normally, even when the machine as a whole is operating but not F, there is no pressure on the then static oil in pipes 104, 105 leading to motor S then closed by valve 12 from high pressure system 13.

While pump SP can deliver different maximum pressures according to its predetermined setting to be described (by PC1 and PC2), yet alone by itself it may vary its pressure delivery in accord with the demands of the load F. For that purpose pump MP here is combined with SP in a manner to be described, so that the combination will deliver pressures which vary automatically in accord with the demands of load F.

In the present invention the combination of pumps SP and MP is set permanently (details in Fig. 1 described below) to cause maintenance of the desired maximum pressure in 13 and Y by the delivery from SP. When the entire machine is in operation, the pressure-delivery from SP below such pre-set maximum is varied automatically by the loads of the starting of F, operating shearing tool G', applying brake 26—28, etc. This variation of pressure delivery from SP below the pre-set limit is effected instantly by any of said loads. The desired load speed is determined by such pre-setting of the volume delivery of pump SP. This pre-setting is via valves PC1 and PC2 to be described later. The desired maximum delivery of SP is maintained at such pre-set rate at all times when the pressure in pump system 13 is less than the pre-set maximum. Whenever the pressure in 13 attains the pre-set maximum, then the volume delivery of SP is reduced automatically to just enough to maintain that maximum pressure. When the volume-delivery once has been set (for a given pressure delivery) the volume delivery does not vary with varying loads so long as the load does not exceed the maximum pressure capacity as set. A desirable volume-capacity for such pump in the present invention is about 0–3,000 cubic inches of oil per minute at any pressure from 300–1,000 lbs. as above. A desirable speed of sheave 11 is 860 R. P. M., sheave 11 being preferably of 16 inch diameter with a four inch belt connected to constant speed motor K. The maximum power input needed for heavy duty is ten HP, altho five HP may be sufficient in cases of lighter stock Z. If desired, as for shearing different thicknesses of stock Z, the maximum pressure-adjustment may be changed by the operator of the machine for special jobs.

High pressure slave pump SP (Fig. 1) for valve 12, slave T and shear F acts as follows in the combination with intermittently reciprocable mechanism F, and with accumulator Y to be described. While SP is operated continuously by sheave 11, yet its automatically variable pressure delivery is comparatively low and may be zero toward the end of the period of rest of T and F, i. e., when valve 12 is in neutral and prior to the operation of said valve by master cam X and after Y has been charged. During the first part of said period of rest of F the pressure delivered by pump SP is (by its automatic adjustment to be described) no more than sufficient to maintain the pre-set maximum pressure in line 13 and in spring 14 of accumulator Y, and to compensate for normal oil leakage, maintaining a pressure of about, say, half a ton per square inch in pipe system 13 connected to valve 12. If and when equilibrium of pressure (maximum as pre-set) has been established in said closed system including Y, (such as prior to the end of the period of rest of T and F), then pump SP in effect automatically idles (save to compensate for any oil leakage) until master cam X is operated to operate valve 12 to connect the oil under pressure in line 13 and Y to the static oil without pressure in line 104 leading to left of piston T. During said period of rest of T and F the oil in pipe system 13 also is static altho pressure then is being increased to the maximum as determined by maximum pressure-adjusting valves PC1 and PC2 (Fig. 1). The pressure in the system 13 and Y acts at all times to govern pump SP (via MP) automatically by controlling its stroke and thereby its pressure delivery from zero to maximum,—the smallest stroke being after the establishment of the above equilibrium of pressure, if ever. (then compensating for oil-leakage and keeping system 13 full of oil under the high pre-set pressure) and the maximum stroke being at such times just after the automatic operation of master cam X, as the load (intermittently operated shear F and die or tool G′, etc.) is maximum on the pump jointly with accumulator Y. But at the time that the high-pressure oil in 13 is clutched by valve 12 to the load F by way of the normally static no-pressure oil in pipe 104, pump SP is not operating at its maximum stroke altho it is continuously rotated by sheave 11. This fact is important because the shearing load on die G′ is very much greater than the inertia load of F and comes on G′ (and F) almost instantly after F begins its short stroke of a few inches. At this point the accumulated pressure in Y is availed of.

I particularly point out and distinctly claim the part, improvement or combination which I claim as my invention or discovery, as follows:

1. In a machine for fabricating long relatively narrow and substantially rigid stock during feeding movement thereof at portions uniformly spaced apart by desired distances, the combination with means feeding such metal stock lengthwise, of normally stationary fabricating mechanism intermittently reciprocable along the length of the moving stock; an hydraulically-operated slave-motor operating said fabricating mechanism and causing a fabricating operation thereby on the stock during the feeding movement thereof; a valve for the slave-motor and normally in neutral position with respect to said motor; an hydraulically-operated master-motor normally idle and connected to the piston of said valve; mechanism including a movable element operated intermittently in accord with the length of stock actually fed to the fabricating mechanism up to the starting of reciprocation thereof and causing hydraulic operation of the master-motor opening said valve and causing operation of the slave-motor and fabricating mechanism from the normal position of rest of the latter; mechanism operated by said movement of the slave-motor and disconnecting the master-motor from said valve; means restoring the master-motor to its normal idle condition; means reversing said valve and slave-motor and causing return by said motor of the fabricating mechanism to its normal position of rest; and mechanism operated by said movement of the slave-motor and moving said valve to its normal neutral position stopping said fabricating mechanism, and restoring the normal connection between the valve and the master hydraulic motor in the normal idle condition of the latter.

2. In a machine for shearing long relatively narrow metal stock into shorter lengths, the combination with shearing mechanism, of continuously operating means feeding the metal stock lengthwise, advancing it beyond the shearing mechanism, the shearing mechanism including two cooperating shearing tools reciprocable over relatively short distances in the vicinity of the points of stock-shearing, one of said tools supporting the stock being fed and the two tools being arranged for shearing by timely movement of the second tool also across the stock along the end of the stock-supporting tool for forcing the advanced stock-portion out of the path of feeding movement of the long stock which path is determined by said stock-supporting tool; continuously-operating hydraulically operated means including means driving said shearing mechanism causing said movements of the two shearing tools; pneumatic means normally operated by said hydraulic means intermediate successive stock-shearings, and accumulating pneumatic pressure and thereafter cooperating with the hydraulic means in supplying power jointly for the movements of the two shearing tools; and a controlling means operated by power from said continuously operating feeding means and arranged for causing timely shearing action of the shearing tools by the joint power of said hydraulic and pneumatic means.

3. In a machine for shearing long relatively narrow metal stock into shorter lengths, the combination with shearing mechanism, of continuously operating means feeding the metal stock lengthwise and advancing it beyond the shearing mechanism, the shearing mechanism including two cooperating shearing tools reciprocable over relatively short distances in the vicinity of the points of stock-shearing, one of said tools supporting the stock which is being fed and the two tools being arranged for shearing by timely movement of the second tool also across the stock along the end of the stock-supporting tool for forcing the advanced stock-portion out of the path of feeding movement of the long stock which path is determined by said stock-supporting tool; continuously-operating hydraulically operated means driving said shearing mechanism causing said movements of the two shearing tools; and pneumatic means normally operated by said hydraulic means after the shearing action of the tools and accumulating pneumatic pressure and thereafter cooperating with the hydraulic means in supplying power jointly for the shearing action of the two shearing-tools.

4. In a machine for shearing long relatively narrow metal stock into shorter lengths, the combination with shearing mechanism, of means feeding the metal stock lengthwise and advancing it beyond the shearing mechanism, the shearing mechanism including two cooperating shearing tools reciprocable over relatively short distances in the vicinity of the points of stock-shearing, one of said tools supporting the stock which is being fed and the two tools being arranged for shearing by timely movement of the second tool also across the stock along the end of the stock-supporting tool for forcing the advanced stock-portion out of the path of feeding movement of the long stock which path is determined by said stock-supporting tool; hydraulically operated means driving the shearing mechanism causing said movements of the two shearing tools; and a controlling means normally lying in position for operation by the stock-portions successively advanced beyond the shearing tools along said stock-supporting tool, said controlling means being intermittently operated by said stock-portions causing timely shearing action of the shearing tools by power from said hydraulic driving mechanism.

5. In a machine for shearing long relatively narrow metal stock into shorter lengths, the combination with shearing mechanism, of means feeding the metal stock lengthwise advancing it beyond the shearing mechanism, the shearing mechanism including two cooperating shearing tools reciprocable over relatively short distances in the vicinity of the points of stock-shearing, one of said tools supporting the stock which is being fed and the two tools being arranged for shearing by timely movement of the second tool also across the stock along the end of the stock-supporting tool for forcing the advanced stock-portion out of the path of feeding movement of the long stock which path is determined by said stock-supporting tool; stock-supporting and guiding means mounted in operative relation extending beyond the shearing tools and cooperating with said stock-supporting tool in holding the stock-portions advanced by said feeding means beyond the shearing tools, in position in the normal line of stock-feeding movement along the stock-supporting tool up to the time of shearing by the two tools; hydraulically operated means driving the shearing mechanism causing said movements of the two shearing tools; and a controlling means normally lying in position for operation by the stock-portions successively advanced beyond the shearing tools along said stock-supporting tool, said controlling means being intermittently operated by said stock-portions causing timely shearing action of the shearing tools by said hydraulic shear-driving means.

6. In a machine for shearing long relatively narrow metal stock into shorter lengths, the combination with shearing mechanism, of means feeding the metal stock lengthwise, advancing it beyond the shearing mechanism, the shearing mechanism including two cooperating shearing tools intermittently reciprocable over relatively short distances in the vicinity of the points of stock-shearing, one of said tools supporting the stock being fed and the two tools being arranged for shearing by timely movement of the second tool also across the stock along the end of the stock-supporting tool for forcing the advanced stock-portion out of the path of feeding movement of the long stock which path is determined by said stock-supporting tool; stock-supporting and guiding means mounted in operative relation extending beyond the shearing tools and cooperating with said stock-supporting tool in holding the stock-portions advanced by said feeding means beyond the shearing tools, in position in the normal line of stock-feeding movement along the stock-supporting tool up to the time of shearing by the two tools; mechanism driving the shearing mechanism causing said movements of said cooperating shearing tools; and a controlling means normally lying in position for operation by the stock-portions successively advanced beyond the shearing tools along said stock-supporting tool, said controlling means being intermittently operated by said stock-portions causing timely shearing action of the shearing tools by said shear-driving mechanism; and means discharging the sheared-off stock-portions from said supporting means, promptly after shearing, completely moving said stock-portions out of the path of movement wherein they operate said controlling means.

7. In a machine for shearing long relatively narrow metal stock into shorter lengths, the combination with shearing mechanism, of means feeding the metal stock lengthwise, advancing it beyond the shearing mechanism, the shearing mechanism including two cooperating shearing tools reciprocable over relatively short distances in the vicinity of the points of stock-shearing, one of said tools supporting the stock which is being fed and the two tools being arranged for shearing by timely movement of the second tool also across the stock along the end of the stock-supporting tool for forcing the advanced stock-portion out of the path of feeding movement of the long stock which path is determined by said stock-supporting tool; stock-supporting and guiding means including a movable element and mounted in operative relation extending beyond the shearing tools and cooperating with said stock-supporting tool in holding the stock-portions advanced by said feeding means beyond the shearing tools, in position in the normal line of stock-feeding movement along the stock-supporting tool up to the time of shearing by the two tools; mechanism driving the shearing mechanism causing said movements of said cooperating shearing tools; a controlling means normally lying in position for operation by the stock-portions successively advanced beyond the shearing tools along said stock-supporting tool, said controlling means being intermittently operated by said stock-portions causing timely shearing action of the shearing tools by the power of said shear-driving mechanism; and means moving said movable element of said stock-supporting means causing discharge of the sheared-off stock-portions therefrom by gravity promptly after shearing, completely moving said stock-portions out of their path of movement wherein they operate said controlling means.

8. In a machine for shearing long relatively narrow metal stock into shorter lengths, the combination with shearing mechanism, of continuously operating means feeding the metal stock lengthwise, advancing it beyond the shearing mechanism, the shearing mechanism including two cooperating shearing tools reciprocable over relatively short distances in the vicinity of the points of stock-shearing, one of said tools supporting the stock which is being fed and the two tools being arranged for shearing by timely movement of the second tool also across the stock along the end of the stock-supporting tool for forcing the advanced stock-portion out of the path of feeding movement of the long stock which path is determined by said stock-supporting tool; stock-supporting and guiding means mounted in operative relation extending beyond the shearing tools and cooperating with said stock-supporting tool in holding the stock-portions advanced by said feeding means beyond the shearing tools, in position in the normal line of stock-feeding movement along the stock-supporting tool up to the time of shearing by the two tools; said guiding and supporting means including at least two longitudinally extending portions of which one is movably mounted; mechanism driving the shearing mechanism causing said movements of said cooperating shearing tools; controlling means operated by power from said feeding means and causing timely shearing action of the shearing tools by the power from said shear-driving mechanism; and means intermittently moving said movable element of said stock-supporting means causing discharge of the sheared-off stock-portions therefrom by gravity promptly after shearing.

9. In a machine for shearing long relatively narrow metal stock into shorter lengths, the combination with shearing mechanism, of continuously operating means feeding the metal stock lengthwise, advancing it beyond the shearing mechanism, the shearing mechanism including two cooperating shearing tools reciprocable over relatively short distances in the vicinity of the points of stock-shearing, one of said tools supporting the stock which is being fed and the two tools being arranged for shearing by timely movement of the second tool also across the stock along the end of the stock-supporting tool for forcing the advanced stock-portion out of the path of feeding movement of the long stock which path is determined by said stock-supporting tool; stock-supporting and guiding means mounted in operative relation extending beyond the shearing tools and cooperating with said stock-supporting tool in holding the stock-portions advanced by said feeding means beyond the shearing tools, in position in the normal line of stock-feeding movement along the stock-supporting tool up to the time of shearing by the two tools; mechanism driving the shearing mechanism causing said movements of said cooperating shearing tools; means controlling timely shearing action of the shearing tools by the power of said shear-driving mechanism; and a controlling target supported on said stock-guiding means and normally lying in the path of feeding movement of the advanced portions of the stock during the stationary condition of said shearing tools, said controlling target being intermittently operated by the successively advanced stock-portions for operation of said controlling means.

10. In a machine for shearing long relatively narrow metal stock into shorter lengths, the combination with shearing mechanism, of means feeding the metal stock lengthwise, advancing it beyond the shearing mechanism, the latter including two cooperating shearing tools reciprocable over relatively short distances in the vicinity of the points of stock-shearing, one of said tools supporting the stock being fed and the two tools being arranged for shearing by timely movement of the second tool also across the stock along the end of the stock-supporting tool for forcing the advanced stock-portion out of the path of feeding movement of the long stock determined by said stock-supporting tool; stock-supporting and guiding means mounted in operative relation extending beyond the shearing tools and cooperating with said stock-supporting tool in holding the stock-portions advanced by said feeding means beyond the shearing tools, in the normal line of stock-feeding movement along the stock-supporting tool up to the time of shearing by the two tools; mechanism driving the shearing mechanism causing said movements of said cooperating shearing tools; means controlling timely shearing action of the shearing tools by the power of said mechanism; and a controlling target supported on said stock-guiding means and adjustable to different positions thereon more or less remote from the shearing tools and lying in the path of feeding movement of the advanced portions of the stock, and intermittently operated by the successively advanced stock-portions for operation of said said controlling means.

11. In a machine for shearing long relatively narrow and substantially rigid metal stock into shorter lengths, the combination with means feeding such stock lengthwise, of shearing mechanism including two cooperating shearing tools reciprocable over relatively short distances along the length of the moving stock, and are being movable alongside the other and across the stock for shearing; an hydraulic slave operating said shearing mechanism; an hydraulic master-motor controlling the operation of the shearing mechanism by said hydraulic slave; a movable master device having an hydraulic connection with said master-motor; and a target-trip in the path of the feeding movement of the long stock and movable by the van of said substantially rigid metal stock from which a shorter length has been sheared off; said target trip being connected to said movable master device and operating the hydraulic master-motor when the next point of the moving stock to be sheared has reached the shearing mechanism.

12. In a machine for shearing long relatively narrow metal stock into shorter lengths, the combination with shearing mechanism, of means feeding the metal stock lengthwise, advancing it beyond the shearing mechanism, the shearing mechanism including two cooperating shearing tools reciprocable over relatively short distances in the vicinity of the points of stock-shearing, one of said tools supporting the stock being fed and the two tools being arranged for shearing by timely movement of the second tool also across the stock along the end of the stock-supporting tool for forcing the advanced stock-portion out of the path of feeding movement of the long stock which path is determined by said stock-supporting tool; stock-supporting and guiding means mounted in operative relation extending beyond the shearing tools and cooperating with said stock-supporting tool in holding the stock-portions advanced by said feeding means beyond the shearing tools, in position in the normal line of stock-feeding movement along the stock-supporting tool up to the time of shearing by the two tools; mechanism driving the shearing mechanism causing said movements of said cooperating shearing tools; means controlling initiations of said movements of the shearing tools by the power of said shear-driving mechanism, said stock-supporting means including a member extending along the line of stock-feed but bodily movable intermittently away from said line for discharge of successively sheared-off portions of the stock; and a controlling target supportable in successive positions longitudinally along said movable stock-supporting member, said target lying in the path of the continuously advancing stock while said supporting member is in stock-supporting position, said target being movable by the stock and thereby moving said supporting member; and connecting means causing movement of said controlling means by said movement of the stock-supporting member by the target and advancing stock.

13. In a machine for fabricating long relatively narrow and substantially rigid metal stock during feeding movement thereof at portions uniformly spaced apart by desired distances, the combination with means feeding such metal stock lengthwise, or fabricating mechanism reciprocable over relatively short distances along the length of the moving stock and also movable toward the stock for fabrication; an hydraulic slave operating said fabricating mechanism and causing a fabricating operation thereby on the stock during the feeding movement thereof; and a master operated by the moving substantially rigid metal stock and causing said hydraulic slave to effect timely intermittent fabricating operations of said fabricating mechanism on the continuously moving stock at said uniformly spaced apart portions of the stock-length.

14. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and also movable toward the stock for fabrication; an hydraulic slave operating said fabricating mechanism and causing a fabricating operation thereby on the stock during the feeding movement thereof, and a master device located in the path of the moving substantially rigid metal stock to be moved by the van thereof, said master controlling the times of intermittent fabricating operations of said fabricating mechanism on said uniformly spaced portions of the length of the moving stock by said hydraulic slave.

15. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; an hydraulic slave operating said fabricating mechanism and causing a fabricating operation thereby on the stock during the feeding movement thereof at said uniformly spaced portions of the stock-length; an hydraulic master controlling the operation of said hydraulic slave; and mechanism operated by the movement of the substantially rigid metal stock and causing such controlling operation of said hydraulic master.

16. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; a reciprocable hydraulic slave operating said fabricating mechanism and causing a fabricating operation thereby on the stock during the feeding movement thereof; a master operated by the moving substantially rigid metal stock and controlling the times of intermittent fabricating operations of said fabricating mechanism on the moving stock at said uniformly spaced portions thereof by said hydraulic slave; and mechanism carried by said fabricating mechanism and reversing the direction of movement of said reciprocable hydraulic slave.

17. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; an hydraulic slave operating said fabricating mechanism and causing fabricating operations thereby on the stock during the feeding movement thereof at said uniformly spaced portions of the stock length; a normally stationary hydraulic master controlling the times of intermittent fabricating operations on the moving stock; and mechanism operated by the moving substantially rigid metal stock and initiating operation of said hydraulic master.

18. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; an hydraulic slave-motor operating said fabricating mechanism and effecting intermittent fabricating operations thereby on the moving stock at said uniformly spaced portions thereof; an hydraulic master-motor controlling the operation of the slave-motor; a valve controlling the supply of hydraulic pressure to said master-motor; and mechanism operating said valve, and itself operated by the movement of the substantially rigid metal stock.

19. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; a reciprocable hydraulic slave operating said fabricating mechanism; master-apparatus controlling the operation of the hydraulic slave and determining the times of operation thereby on the moving stock at said uniformly spaced portions of the stock-length; mechanism operated by the moving substantially rigid metal stock and operating the master-apparatus; and mechanism operated by the hydraulic slave and operating the master-apparatus to reverse the direction of the reciprocable hydraulic slave.

20. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; a slave operating the fabricating mechanism and determining the times of operation thereby on the moving stock at said uniformly spaced portions of the stock-lengths; an hydraulic master controlling the operation of said slave; and mechanism operated by the movement of the substantially rigid metal stock and controlling the operation of the slave by the hydraulic master.

21. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; an hydraulically-operated slave operating said fabricating mechanism and causing fabricating operations thereby on the stock during the movement of the stock; an hydraulically operated master controlling the operation of the hydraulic slave; and mechanism operated by movements of the substantially rigid metal stock after successive fabricating operations and operating the master whereby the fabricating movements of the fabricating mechanism on the moving stock are caused intermittently at said portions thereof which are uniformly spaced apart.

22. In a machine for straightening and shearing long relatively narrow and substantially rigid metal stock during feeding movement of the stock at portions resulting in uniform sheared shorter lengths, the combination with means feeding such metal stock lengthwise; of means straightening the stock during its feeding movement before shearing; shearing mechanism including two cooperating shearing tools reciprocable over relatively short distances along the length of the moving stock, one of said tools being movable alongside the other and across the stock for shearing action; an hydraulically-operated slave moving the shearing mechanism and effecting shearing action; and master mechanism controlling the operation of said hydraulic slave and itself operated by the remaining portion of the moving substantially rigid metal stock from which advanced portions previously have been sheared off and causing shearing operations of the slave on the moving stock producing said uniform shorter stock-lengths.

23. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; an hydraulic slave operating said fabricating mechanism and causing a fabricating operation thereby on the stock during the feeding movement thereof; a valve controlling said hydraulic slave; an hydraulic master-motor operating said slave; a master valve for said hydraulic master-motor; and mechanism operated by the moving substantially rigid metal stock and opening said master-motor valve causing operation of said fabricating mechanism on the moving stock at said uniformly spaced portions of the stock-length.

24. In a machine for shearing long relatively narrow and substantially rigid metal stock into shorter uniform lengths during feeding movement of the stock, the combination with means feeding such metal stock lengthwise; of shearing mechanism including two cooperating shearing tools reciprocable over relatively short distances along the length of the moving stock and during shearing moving the stock-portion being sheared out of the path of feeding movement of the long stock; an hydraulic slave effecting cyclic operation of the shearing mechanism; mechanism supporting the advanced portion of the stock during the shearing operation, said stock supporting mechanism having a portion lying in the path of movement of the long substantially rigid metal stock and movable thereby; and master mechanism controlling the times of shearing actions on the moving stock for production of said uniform shorter stock-lengths; said movable portion of the stock-supporting mechanism being connected to said master-mechanism and causing the latter to be operated by the main portion of the long substantially rigid metal stock from which a previously advanced portion has been sheared off.

25. In a machine for shearing long relatively narrow and substantially rigid metal stock into shorter uniform lengths during feeding movement of such stock, the combination with means for feeding such metal stock lengthwise; of shearing mechanism including two cooperating shearing tools reciprocable over relatively short distances along the length of the fed stock and during shearing moving the stock-portion being sheared out of the path of feeding movement of the long stock; an hydraulically-operated slave operating said shearing mechanism; a target-trip normally lying in the path of feeding movement of the substantially rigid metal stock and movable by the latter, and master-apparatus controlled by the movement of said target trip and itself controlling the operation of the hydraulic slave producing said uniform shorter stock-lengths.

26. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; an hydraulic slave-motor operating said fabricating mechanism and causing a fabricating operation thereby on the stock during the movement of the stock; a valve for said hydraulic motor; master-apparatus operating said valve; and mechanism operated by the movement of the substantially rigid metal stock and controlling the operation of said master-apparatus causing operation of the fabricating mechanism on the moving stock at said uniformly spaced portions of the stock-length.

27. In a machine for shearing long relatively narrow and substantially rigid metal stock into shorter uniform lengths, the combination with means feeding such metal stock lengthwise, of means which during shearing supports the portion of the long stock to be sheared off; shearing mechanism including two cooperating shearing tools reciprocable over relatively short distances along the length of the fed stock and during shearing moving the stock-portion being sheared out of the path of feeding movement of the long stock, an hydraulically operated slave operating said shearing mechanism; master-apparatus controlling the times of shearing actions of said tools; a target trip controlling operation of said master-apparatus, and normally lying in the path of feeding movement of the substantially rigid stock and movable thereby causing shearing of the moving long stock into said uniform shorter length; and means discharging the sheared portion from said supporting means discontinuing the effect of said stock-portion on said target-trip.

28. In a machine for shearing long relatively narrow and substantially rigid metal stock into shorter uniform lengths, the combination with means feeding such metal stock lengthwise, of depressible means normally supporting the portion of the long stock to be sheared off; shearing mechanism including two cooperating shearing tools reciprocable over relatively short distances along the length of the fed stock and during shearing moving the stock-portion being sheared out of the path of feeding movement of the long stock, an hydraulically operated slave operating said shearing mechanism; master-apparatus controlling the times of shearing actions of said tools; a target-trip movably supported in the path of the moving stock, operated thereby and connected to control said master-apparatus causing shearing of the moving long stock into said uniform shorter lengths; and mechanism operated by power from said hydraulic slave and depressing said stock-supporting means upon the shearing off of the stock causing gravity discharge of the sheared stock-portion; said connection between the target-trip and master-apparatus including means yielding to said movement of the target-trip by the moving stock but the target-trip mechanism having a tendency to return to its normal position in the path of the feeding movement of the stock when the sheared-off stock portion has been discharged by the depression of said stock-supporting means.

29. In a machine for shearing long relatively narrow and substantially rigid metal stock into shorter uniform lengths, the combination with means feeding such metal stock lengthwise, of shearing mechanism including two cooperating shearing tools reciprocable over relatively short distances along the length of the moving stock and during shearing moving the stock-portion being sheared, out of the path of feeding movement of the long stock; movable mechanism normally supporting an advanced portion of the stock in position to be sheared off; an hydraulically operated slave operating said shearing apparatus; master apparatus controlling said hydraulic slave and operated by feeding movement of the substantially rigid metal stock causing shearing of the moving long stock into said uniform shorter stock-lengths; mechanism positively operated by said slave and operating said stock-supporting mechanism to discharge the sheared-off stock-portion; and mechanism yielding to said positive operation of said stock-supporting mechanism but normally tending to hold the latter in its stock-supporting position.

30. In a machine for fabricating long relatively narrow and substantially rigid metal stock during feeding movement thereof at portions uniformly spaced apart by desired distances, the combination with means feeding such metal stock lengthwise, of fabricating mechanism reciprocable over relatively short distances along the length of the moving stock and movable toward the stock for fabrication; a slave working the fabricating mechanism; an hydraulic system controlling the work of the slave and comprising an hydraulic pump, an hydraulic motor and a valve controlling supply of hydraulic pressure from the pump to the motor; a movable target-trip normally lying in the path of feeding movement of the long stock; and mechanism connecting the target-trip with said valve causing operation of the fabricating mechanism on the moving stock at said uniformly spaced portions of the stock-length.

31. In a machine for shearing long relatively narrow and substantially rigid metal stock into shorter uniform lengths, the combination with means feeding such stock lengthwise, of shearing mechanism including two cooperating shearing tools reciprocable over relatively short distances along the length of the moving stock and during shearing moving the stock-portion being sheared, out of the path of feeding movement of the long-stock; slave apparatus operating said shearing mechanism; an hydraulic master-motor controlling the operation of the shearing mechanism by said slave apparatus; a movable master device controlling the operation of said hydraulic motor; and a target-trip normally lying in the path of feeding movement of the long stock and operated thereby causing movement of said master device in turn controlling times of shearing action and producing said uniform shorter sheared stock-lengths.

32. In a machine for fabricating long relatively narrow and substantially rigid metal stock during feeding movement thereof and successively at successive uniformly spaced portions of its length, the combination with means feeding such metal stock lengthwise, of fabricating mechanism reciprocable over relatively short distances along the length of the stock being fed and movable toward the stock for fabrication; an hydraulic motor effecting such excursions of said fabricating mechanism and fabricating movements thereof; an hydraulic pump connected to supply pressure to said hydraulic motor; an air-compressor piston operated by said hydraulic pressure; mechanism controlling the times of fabricating action of the fabricating mechanism by the hydraulic pressure from said pump boosted by the pneumatic pressure produced by said piston; and means operating said controlling mechanism intermittently during the operation of said stock-feeding means at times causing operation of said fabricating mechanism on the moving stock at said uniformly spaced portions of the stock-length.

33. In a machine for fabricating long relatively narrow and substantially rigid metal stock during feeding movement thereof and successively at successive uniformly spaced portions of its length, the combination with means feeding such metal stock lengthwise, fabricating mechanism reciprocable over relatively short distances along the length of the stock being fed and movable toward the stock for fabrication; an hydraulic motor effecting such excursions of said fabricating mechanism; a piston; a pneumatic pressure chamber adjacent one side of said piston; an hydraulic container; mechanism controlling the times of fabricating action by the fabricating means jointly by hydraulic pressure and by pneumatic pressure from said pneumatic pressure chamber; and means operating said controlling mechanism intermittently during the operation of said stock-feeding means at times causing operation of said fabricating mechanism on the moving stock at said uniformly spaced portions of the stock-length.

34. In a machine for fabricating long relatively narrow and substantially rigid metal stock during feeding movement thereof and successively at successive uniformly spaced portions of its length, the combination with means feeding such stock lengthwise, of fabricating mechanism reciprocable over relatively short distances along the length of the stock being fed and movable toward the stock for fabrication; an hydraulic motor effecting such reciprocations of said fabricating mechanism and the fabricating action thereof; an air-compressor putting under pneumatic pressure the liquid operating said motor; and mechanism controlling the times of fabricating action of said fabricating mechanism by the hydraulic motor and itself operated intermittently during the operation of said stock-feeding means at times causing operation of said fabricating mechanism on the moving stock at said uniformly spaced portions of the stock-length.

35. In a machine for fabricating long relatively narrow metal stock during feeding movement thereof and successively at successive portions of its length, the combination with means feeding such stock lengthwise, of fabricating mechanism reciprocable along the length of the stock being fed and movable toward the stock for fabrication; an hydraulic motor effecting such reciprocations of said fabricating mechanism and the fabricating action thereof; and an hydraulic pump including a pneumatically operated piston acting on a liquid to supply hydraulic pressure to said hydraulic motor.

36. In a machine for fabricating long relatively narrow metal stock during feeding movement thereof and successively at successive portions of its length, the combination with means feeding the stock lengthwise, of fabricating mechanism reciprocable over relatively short distances along the length of the stock being fed and movable toward the stock for fabrication; an hydraulic motor effecting such reciprocations of said fabricating mechanism; and an hydraulic pump including a pneumatically operated piston acting on the liquid supplied to said motor and thereby increasing the hydraulic pressure operating said motor.

37. In a machine for fabricating long relatively narrow metal stock during feeding movement thereof at portions of the stock spaced apart by uniform desired distances, the combination with means feeding the stock lengthwise, of fabricating mechanism reciprocable over relatively short distances along the length of the stock being fed and movable toward the stock for fabrication; an hydraulic motor reciprocating said fabricating mechanism and effecting said fabricating action thereof; means including a pneumatic compressor supplying hydraulic pressure to said hydraulic motor; and mechanism controlling the timely fabricating actions of said fabricating mechanism causing operation thereof on the moving stock at said uniformly spaced portions of the stock length.

38. In a machine for fabricating long relatively narrow metal stock during feeding movement thereof at portions uniformly spaced apart by desired distances, the combination with mechanism feeding the stock lengthwise, of fabricating mechanism reciprocable over relatively short distances along the length of the moving stock but movable toward the stock for fabrication; a reciprocating hydraulic slave effecting such excursions of said fabricating mechanism along the length of the stock and effecting intermittent fabricating operations thereby on the stock during the feeding movement of the latter; a valve automatically reversing the direction of operation of said slave and thereby of the movement of the fabricating mechanism along the length of the stock; means containing a liquid to operate said slave; pneumatic pressure apparatus supplying pressure to said liquid to cause the liquid to operate the slave; and a master controlling the times of said intermittent fabrication operations of said fabricating mechanism on the moving stock at said uniformly spaced portions of the stock-length.

39. In a machine for fabricating long relatively narrow metal stock during feeding movement thereof at portions uniformly spaced apart by desired distances, the combination with mechanism feeding the stock lengthwise, of fabricating mechanism reciprocable over relatively short distances along the length of the moving stock but movable toward the stock for fabrication; an hydraulic slave effecting such excursions of said fabricating mechanism along the length of the stock and effecting intermittent fabricating operations on the stock during the feeding movement of the latter; means containing a liquid to operate said slave; pneumatic pressure apparatus supplying pressure to said liquid to cause the liquid to operate the slave; and a master controlling the times of said intermittent operations of said fabricating mechanism on the moving stock at said uniformly spaced portions of the stock-length.

In testimony whereof I hereunto affix my signature.

JOSEPH H. ROBERTS.